(12) United States Patent
Brakensiek et al.

(10) Patent No.: US 9,552,140 B2
(45) Date of Patent: Jan. 24, 2017

(54) METHOD AND APPARATUS FOR PROVIDING DATA ENTRY CONTENT TO A REMOTE ENVIRONMENT

(75) Inventors: Jorg Brakensiek, Mountain View, CA (US); Raja Bose, Mountain View, CA (US)

(73) Assignee: Nokia Technologies Oy, Espoo (FI)

( * ) Notice: Subject to any disclaimer, the term of this patent is extended or adjusted under 35 U.S.C. 154(b) by 870 days.

(21) Appl. No.: 13/188,055

(22) Filed: Jul. 21, 2011

(65) Prior Publication Data

US 2013/0024783 A1  Jan. 24, 2013

(51) Int. Cl.
*G06F 3/0483* (2013.01)
*H04M 1/725* (2006.01)

(52) U.S. Cl.
CPC ........ *G06F 3/0483* (2013.01); *H04M 1/72527* (2013.01); *H04M 1/7253* (2013.01)

(58) Field of Classification Search
USPC ....... 715/753, 733, 734, 736, 737, 740, 748, 715/751, 758, 759
See application file for complete search history.

(56) References Cited

U.S. PATENT DOCUMENTS

| | | |
|---|---|---|
| 2005/0256697 A1 | 11/2005 | Narayanaswami et al. |
| 2005/0275632 A1 | 12/2005 | Pu et al. |
| 2007/0203641 A1 | 8/2007 | Diaz et al. |
| 2010/0011299 A1 | 1/2010 | Brodersen et al. |
| 2010/0269039 A1 | 10/2010 | Pahlavan et al. |
| 2010/0302141 A1 | 12/2010 | Shankar et al. |

FOREIGN PATENT DOCUMENTS

| | | |
|---|---|---|
| CN | 101582053 A | 11/2009 |
| EP | 2 053 497 A1 | 4/2009 |
| EP | 2 305 506 A1 | 4/2011 |
| JP | 2010-272930 A | 12/2010 |
| WO | WO 2009/073806 A2 | 6/2009 |
| WO | WO 2009/140095 A2 | 11/2009 |

OTHER PUBLICATIONS

Danny Sullivan, "How Google Instant's Autocomplete Suggestions Work," Apr. 2011, pp. 1-11.*
Nancy Blachman et al., "How to Use Google: Entering a Query—Google Guide," Aug. 2008, pp. 1-3.*
Askville, "how to access internet in my mobile through my laptop?" Aug. 2009, pp. 1 & 2.*

(Continued)

*Primary Examiner* — Maryam Ipakchi
(74) *Attorney, Agent, or Firm* — Alston & Bird LLP (57) ABSTRACT

Various methods for providing data entry content to a remote environment are provided. One example method includes receiving, at a device, a data entry field selection message notifying that a selection of a data entry field has occurred at a remote device, modifying a focus of a user interface of the device to the data entry field, retrieving current data content of the data entry field, and causing an indication to be provided to the remote device informing the remote device of the current data content of the data entry field to enable the remote device to display the current data content of the data entry field in a data entry input interface. Similar and related example methods and example apparatuses are also provided.

26 Claims, 7 Drawing Sheets

(56) References Cited

OTHER PUBLICATIONS

International Search Report for Application No. PCT/FI2012/050734 dated Feb. 14, 2013.
Office Action for Chinese Application No. 201280045725.1 dated Feb. 28, 2015.
Office Action for Japanese Application No. 2014-520695 dated Mar. 18, 2015.
Office Action for Korean Application No. 2014-7004397 dated Mar. 30, 2015.
Office Action for Chinese Application No. 201280045725.1 dated Dec. 17, 2015.
Office Action for Korean Application No. 2014-7004397 dated Jan. 29, 2016.
Office Action for Chinese Application No. 201280045725.1 dated Aug. 5, 2016.
European Search Report for Application No. EP 12 81 5413 dated Jan. 29, 2015.

* cited by examiner

METHOD AND APPARATUS FOR PROVIDING DATA ENTRY CONTENT TO A REMOTE ENVIRONMENT

TECHNICAL FIELD

Embodiments of the present invention relate generally to the implementation of a remote user interface, and, more particularly, relate to a method and apparatus for providing data entry content to a remote environment.

BACKGROUND

Mobile computing devices continue to evolve such that the mobile devices are capable of supporting new and powerful applications. In some instances a handheld mobile device may include sufficient processing power, network connectivity, and memory storage perform a given application, but the small form factor of a handheld mobile device may limit the usability of the application, for example, due to a small user interface and screen.

As such, in situations where the user may be stationary, relative to a remote device having a larger user interface (e.g., a computer terminal, an in-vehicle head unit, a table or pad device), the user may wish to use the user interface of the remote device, rather than the user interface of the handheld device. For example, considering a global positioning application, a user may wish to have a handheld mobile computing device connect with a device having a larger display in a vehicle for displaying maps and other location information on the remote device. Similarly, a mobile computing device operating as a media player may also connect with another device to provide the user with an interface to the mobile computing device via display located in the traditional location for a radio in a vehicle.

To interface with and support a remote user interface environment, the handheld device may provide video and audio information to permit the reproduction of the user interface of the handheld device on the remote device. The remote device should be capable of fully interfacing with the handheld device to receive user input and provide output to the user, and the handheld device should support the remote device's ability to do so.

BRIEF SUMMARY

Example methods and example apparatuses are described that facilitate providing data entry content to a remote environment. One example method embodiment includes receiving, at a device, a data entry field selection message notifying that a selection of a data entry field has occurred at a remote device, modifying a focus of a user interface of the device to the data entry field, retrieving current data content of the data entry field, and causing an indication to be provided to the remote device informing the remote device of the current data content of the data entry field to enable the remote device to display the current data content of the data entry field in a data entry input interface.

An additional example embodiment is an apparatus comprising at least one processor and at least one memory including computer program code. The at least one memory and the computer program code may be configured to, with the at least one processor, cause the example apparatus to perform various functionality. In this regard, the example apparatus may be caused to perform receiving a data entry field selection message notifying that a selection of a data entry field has occurred at a remote device, modifying a focus of a user interface to the data entry field, retrieving current data content of the data entry field, and causing an indication to be provided to the remote device informing the remote device of the current data content of the data entry field to enable the remote device to display the current data content of the data entry field in a data entry input interface.

Another example embodiment is an example non-transitory computer readable medium having computer program code stored thereon. When executed, the computer program may cause an apparatus to perform receiving a data entry field selection message notifying that a selection of a data entry field has occurred at a remote device, modifying a focus of a user interface to the data entry field, retrieving current data content of the data entry field, and causing an indication to be provided to the remote device informing the remote device of the current data content of the data entry field to enable the remote device to display the current data content of the data entry field in a data entry input interface.

Another example embodiment is an apparatus comprising means for receiving a data entry field selection message notifying that a selection of a data entry field has occurred at a remote device, means for modifying a focus of a user interface to the data entry field, means for retrieving current data content of the data entry field, and means for causing an indication to be provided to the remote device informing the remote device of the current data content of the data entry field to enable the remote device to display the current data content of the data entry field in a data entry input interface.

Another example method embodiment includes receiving a selection of a data entry field at a first device, causing a data entry field selection message to be transmitted, by the first device to a second device, notifying the second device that the selection of the data entry field has occurred, receiving an indication from the first device informing the second device of the current data content of the data entry field, and populating the data entry field in a data entry input interface with the current data content.

An additional example embodiment is an apparatus comprising at least one processor and at least one memory including computer program code. The at least one memory and the computer program code may be configured to, with the at least one processor, cause the example apparatus to perform various functionality. In this regard, the example apparatus may be caused to perform receiving a selection of a data entry field at a first device, causing a data entry field selection message to be transmitted, by the first device to a second device, notifying the second device that the selection of the data entry field has occurred, receiving an indication from the first device informing the second device of the current data content of the data entry field, and populating the data entry field in a data entry input interface with the current data content.

Another example embodiment is an example non-transitory computer readable medium having computer program code stored thereon. When executed, the computer program cause an apparatus to perform receiving a selection of a data entry field at a first device, causing a data entry field selection message to be transmitted, by the first device to a second device, notifying the second device that the selection of the data entry field has occurred, receiving an indication from the first device informing the second device of the current data content of the data entry field, and populating the data entry field in a data entry input interface with the current data content.

Another example embodiment is an apparatus comprising means for receiving a selection of a data entry field at a first device, means for causing a data entry field selection message to be transmitted, by the first device to a second device, notifying the second device that the selection of the data entry field has occurred, means for receiving an indication from the first device informing the second device of the current data content of the data entry field, and means for populating the data entry field in a data entry input interface with the current data content.

BRIEF DESCRIPTION OF THE DRAWING(S)

Having thus described the invention in general terms, reference will now be made to the accompanying drawings, which are not necessarily drawn to scale, and wherein:

DETAILED DESCRIPTION

Example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments of the present invention, to refer to data capable of being transmitted, received, operated on, and/or stored.

As used herein, the term 'circuitry' refers to all of the following: (a) hardware-only circuit implementations (such as implementations in only analog and/or digital circuitry); (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Figure 1:
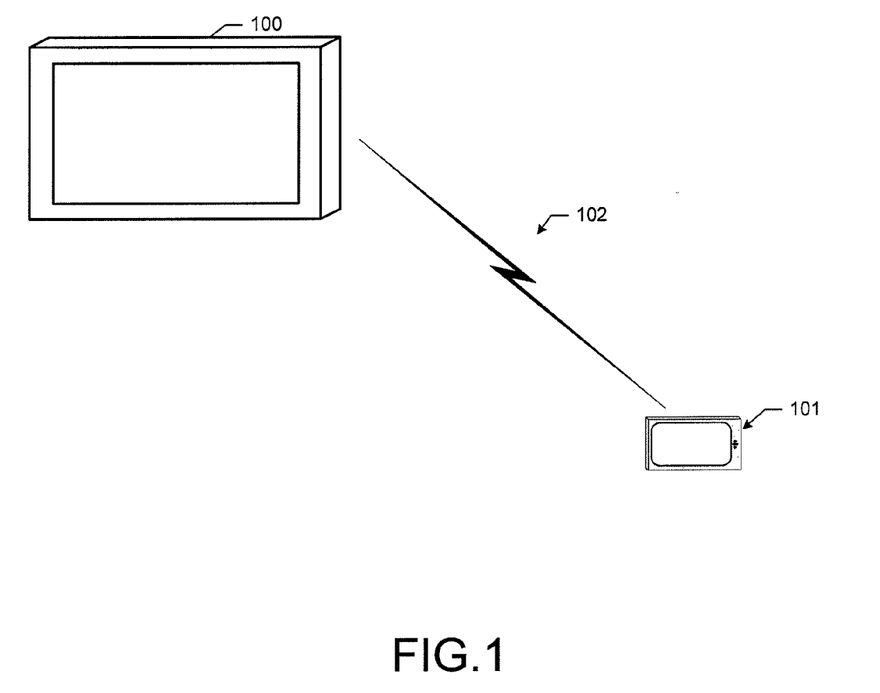
FIG. 1 illustrates a system for implementing a remote user interface according to various example embodiments.

FIG. 1 illustrates an example system in accordance with various example embodiments of the present invention. The example system includes a remote user interface (UI) device 100, User Equipment (UE) 101, and a communications link 102.

The remote UI device 100 may be any type of computing device configured to project the user interface of the UE 101. As such, the remote UI device 100 may include user interface components and functionality. The user interface components may be controlled by one or more processors and one more memories included in the remote UI device 100 for performing the functionality of the remote UI device as described herein. In some example embodiments, the remote UI device 100 may include a touch screen display that is configured to receive input from a user via touch events with the display. The remote UI device 100 may alternatively or additionally include other user interface hardware, such as a physical keyboard or keypad, a mouse, a trackball, or other pointing device, speakers, a microphone, and the like. The remote UI device may support various techniques of receiving user input including but not limited to voice recognition, handwriting recognition, and the like. Further, the remote UI device 100 may include a keyboard, speakers, a microphone, and the like.

The remote UI device 100 may also include a wireless communications interface for communicating with the UE 101 via the communications link 102. According to some example embodiments, the remote UI device 100 and the UE 101 may communicate via a wired link. The communications link 102 may be any type communications link capable of supporting communications between the remote UI device 100 and the UE 101. According to some example embodiments, the communications link 102 may be a WLAN, Bluetooth, or other type of wireless link.

The UE 101 may be any type of mobile computing and communications device. According to some example embodiments, the UE 101 may be a smart phone, tablet, or pad device. The UE 101 may be configured to communicate with the remote UI device 100 via the communications link 102. The UE 101 may also be configured to execute and implement applications via at least one processor and at least one memory included within the UE 101.

According to some example embodiments, the UE 101 may be configured to, via the communications connection 102, direct the remote UI device 100 to output a user interface and receive user input provided via the remote UI device 100. The projected user interface provided by the remote UI device 100 may be the same interface that is being presented on a display of the UE 101 or that would have been presented had the display of the UE 101 been active. In some example embodiments, framebuffer scanning or similar techniques may be used to reproduce at least a portion of a user interface on the of the remote UI device 100 via the communications link 102. In some example embodiments, the remote UI device 100 may provide a modified user interface that is derived from the user interface of the UE 101. For example, consider an example scenario where the remote UI device 100 is installed in a vehicle as a vehicle head unit. The driver of the vehicle may wish to use the remote UI device 100 as an interface to the UE 101 due, for example, to the convenient location of the remote UI device 100 within the vehicle and/or the larger size of the screen. The UE 101 may be configured to link with the remote UI device 100, and direct the remote UI device 100 to present a user interface for engaging the user via the remote UI device 100. The display of the remote UI device 100 may include various controls that may or may not be associated with control on the user interface of the UE 101, such as a steering wheel control, a touch controls, rotary knobs, and/or other configurable or dedicated buttons. In some instances the user interface provided by the remote UI device 100 may be modified for ease of use by a user that is also operating a moving vehicle.

The interaction between the UE 101 and the remote UI device 100 provides an example of mobile device interoperability, which may also be referred to as smart space, remote environment, and remote client. In some instances, the UE 101 may be described as being in the "terminal mode" when the remote UI device 100 is accessed and controlled the UE 101. The features and capabilities of the UE 101 may be projected onto an external environment (e.g., the remote UI device 100), and the external environment may appear as if the features and capabilities are inherent to external environment such that the dependency on the UE 101 is not apparent to a user. Projecting the UE 101's features and capabilities may involve exporting the User Interface (UI) screen of the UE 101, as well as command and control to the external environment whereby, the user may comfortably interact with the external environment in lieu of the UE 101.

Figure 2:
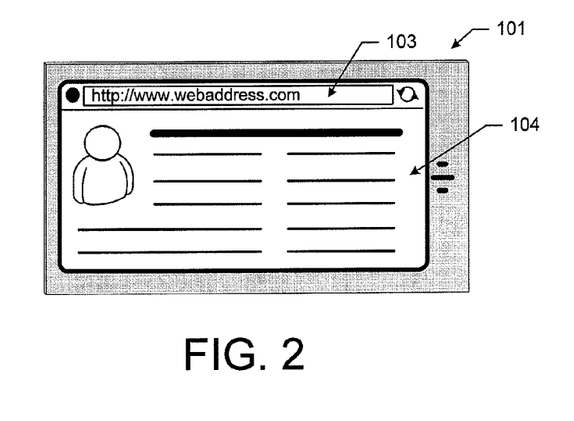
FIG. 2 illustrates a user equipment displaying content and a data entry field according to various example embodiments.
Figure 3:
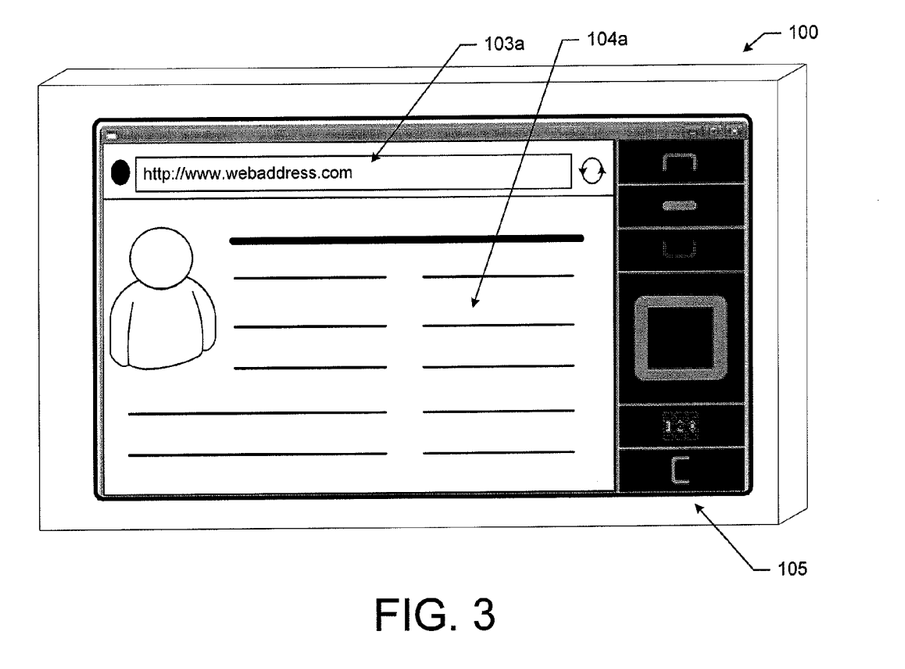
FIG. 3 illustrates a remote user interface device projecting the user interface of a user equipment according to various example embodiments.

FIGS. 2 and 3 illustrate and example scenario where the user interface of the UE 101 is being projected onto the display of the remote UI device 100. FIG. 2 illustrates the UE 101 having navigated to a particular website. The content of the web site 104 is displayed together with a data entry field 103 that has the current uniform resource locator (URL) as the current data content (data value) in the data entry field 103. FIG. 3 provides an illustration of an example remote UI device 100 that is providing a projected user interface of the UE 101 of FIG. 2. The content 104 is projected to the remote UI device 100 as content 104a and the data entry field 103 is projected to the data entry field 103a. The user interface of the remote UI device 100 also presents additional controls 105 that may facilitate safe use the remote UI device 100 in a vehicular environment.

When the remote UI device 100 is projecting the user interface of the UE 101, the remote UI device 100 may also need to facilitate a user's ability to input data via the remote UI device 100, to be provided to the UE 101. In this regard, a user may wish to enter data (e.g., text) into a data entry field (e.g., a text field) that has been projected to the remote UI device 100, such as the data entry field 103a of FIG. 3. To change the data in the data entry field, the user may select the data entry field 103a (e.g., via a touch of the field on the screen) of the remote UI device 100.

Figure 4:
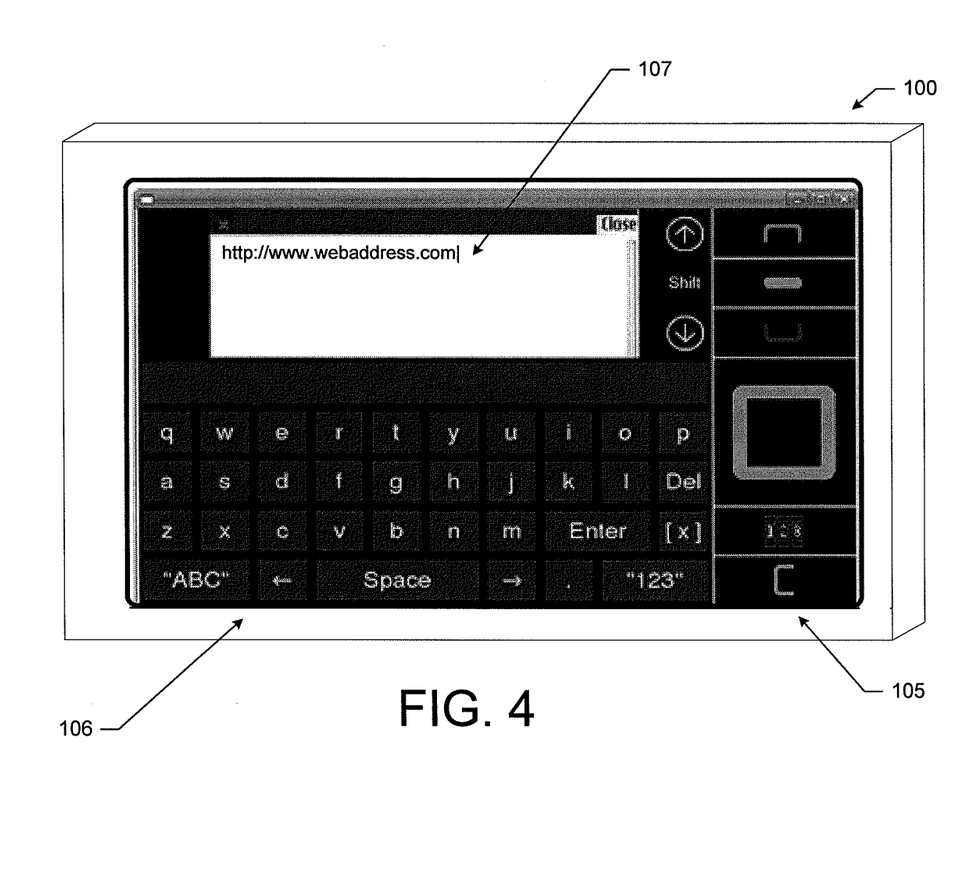
FIG. 4 illustrates a remote user interface device displaying a virtual keyboard for entering data into a data entry field according to various example embodiments.

If this type of operation were taking place directly on the UE 101, a virtual keyboard may be provided, that may cover a portion of the screen to permit user input of, for example, text characters. However, in the terminal mode, the interaction is occurring between the user and the remote UI device 100. The remote UI device 100 may be configured to similarly supply the user with a virtual keyboard or some other type of data entry input interface. However, the keyboard may be modified to, for example, be displayed a larger keyboard to facilitate ease of use during driving. For example, the virtual keyboard that is used on the remote UI device 100 may be an over-sized or full-screen keyboard with a data entry field/box combination. FIG. 4 illustrates an example of an oversized virtual keyboard 106 with a data entry field 107 being displayed on the remote UI device 100. The particular keyboard to be presented on the remote UI device 100 may be triggered for presentation by a Virtual Networking Computing (VNC) Virtual Keyboard Trigger message, which may be sent from the UE 101.

Because the projection of the user interface from the UE 101 to the remote UI device 100 is often performed using a pixel-based framebuffer scanning technique, the remote UI device 100 may only be providing the current data content of the data entry field on a pixel or image level. As such, the remote UI device 100 may be unaware of the actual data value of the current data content of the data entry field. The data entry field 107 may be isolated from the native presentation of the data entry field 103 or 103a since the native presentation may be merely an image, while the data entry field 107 may require the data value to populate the field. As such, the current data content of the data entry field 103, in this instance the text "http://www.webaddress.com", may need to be retrieved and entered into the data entry field 107 to permit, on the remote UI device 100, modification of the current data content, deletion of some or all of the current data content, or to permit reading of the current data content if, for example, displaying the virtual keyboard blocks the visibility of the data entry field.

To populate the data entry field 107 that is associated with the virtual keyboard with the current data content of the data entry field 103, a combination of messages from the UE 101 to the remote UI device 100 may be utilized. In this regard, according to some example embodiments, a keyboard trigger message in the form of, for example, a VNC Virtual Keyboard Trigger message may be provided by the UE 101 to the remote UI device 100, with a cut text message, such as a VNC Server Cut Text message, to both trigger the presentation of the virtual keyboard and populate the associated data entry field with the current data content. In this manner, the current data content of the data entry field can be provided out-of-band from the typical VNC pixel oriented framebuffer updates that would be typically used to project the user interface of the UE 101.

Figure 5:
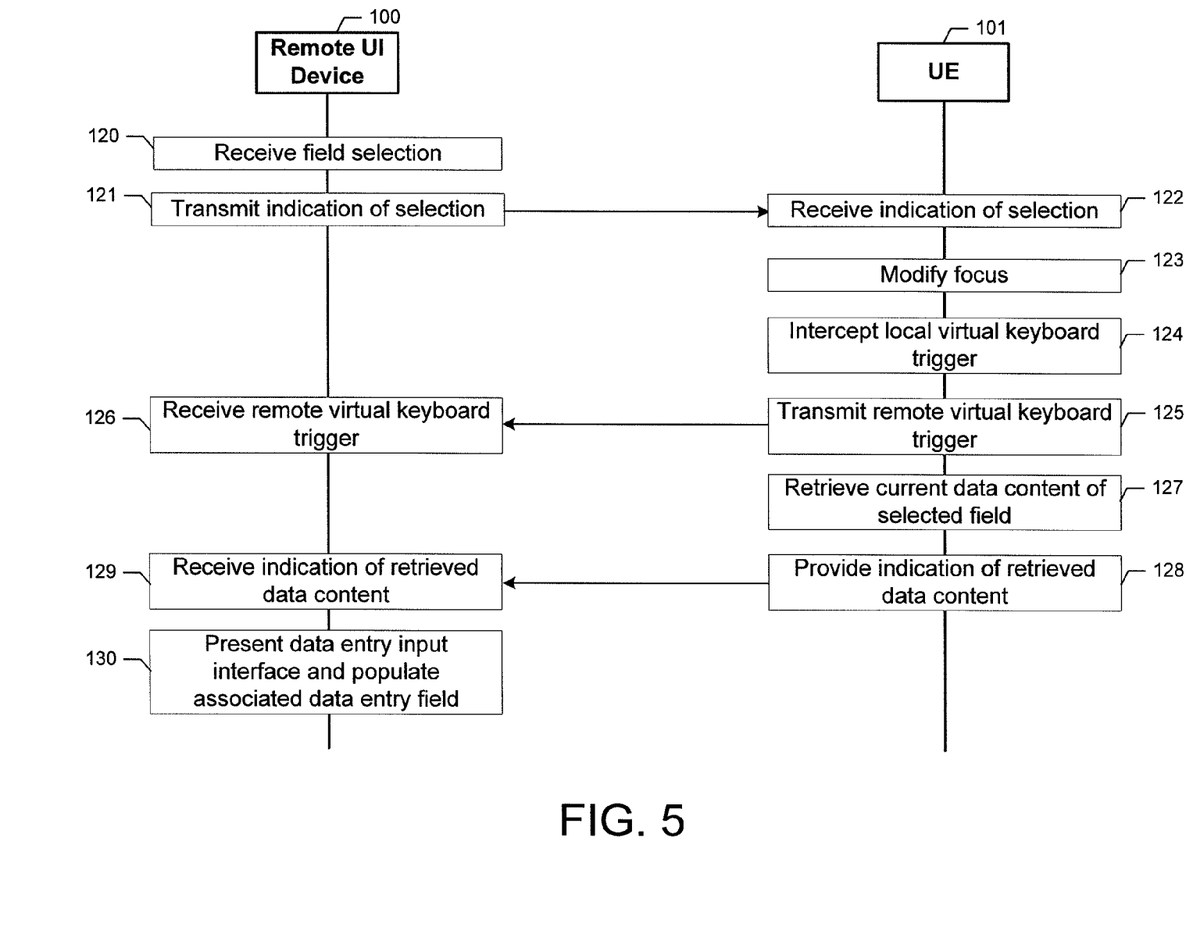
FIG. 5 is a signaling and operational flow diagram for providing data entry content to a remote environment according various example embodiments.

FIG. 5 illustrates a signaling and flow diagram of example methods of the present invention from a system perspective, as well as, from the perspectives of each of the remote UI device 100 and the UE 101. Within the context of FIG. 5, the remote UI device 100 and the UE 101 share a communications connection that permits the user interface of the UE 101 (or a subset thereof) to be projected onto the user interface of the remote UI device 100. In this regard, the remote UI device 100 may be connected to the UE using a remote framebuffer/desktop protocol while implementing a terminal mode that projects the UE 101's screen on the display of the remote UI device 100.

At 120, the remote UI device 100 receives a data entry field selection. In this regard, for example, a user may touch a data entry field (e.g., a text entry field) on the display of the remote UI device 100 to perform the selection that is received by the remote UI device 100. In response to the selection of a data entry field, the remote UI device 100 may be configured to transmit an indication of the selection at 121 in the form of a data entry field selection message. The UE 101 may receive the data entry field selection message at 122 as a notification that selection of a data entry field has occurred. The data entry field selection message may include a description of a touch event at particular coordinates of the display and the UE 101 may determine that the event is a selection of a data entry field upon analyzing the coordinates relative to the current presented content. The data entry field selection message may be sent via a remote protocol, for example as a VNC Pointer Event message, to the UE 101. At 123, the UE 101 may be configured to modify the focus (e.g., move the cursor) to the data entry field and take action to assist the user with data entry. According to some example embodiments, the UE 101 may inject a pointer event to modify the focus to emulate a pointer event at the same location.

Subsequently, the UE 10 may attempt to trigger the presentation of a virtual keyboard in both the local and remote user interfaces. However, according to some example embodiments, at 124, the local virtual keyboard trigger may be intercepted and suppressed to prevent the automatic presentation of a virtual keyboard on the UE 101's user interface, and accordingly, the projected user interface of the remote UI device 100.

Upon detection of the intercepted attempt to trigger the virtual keyboard or in response to modification of the focus to a data entry field, the UE 101 may be configured to transmit a remote virtual keyboard trigger at 125 and the remote UI device 100 may receive the remote virtual keyboard message at 126. In this manner, the UE 101 may trigger the presentation of a data entry interface (e.g., a virtual keyboard) on the remote IU device 100, which may enable the entry of data in an associated data entry field. The remote virtual keyboard trigger message may be a VNC Terminal Mode (TM) Virtual Keyboard Trigger message, and the message may notify the remote UI device 100 of the need for data (e.g., text) input support.

At 127, the UE 101 may be configured to retrieve the current data content of the selected field. Techniques associated with the use of a virtual keyboard may be used to retrieve the current data content. For example, the UE 101 may analyze the local data value that is associated with the data field to determine the current data content and thereby retrieve the data.

At 128, the UE 101 may be configured to provide an indication to the remote UI device 100 of the current data content of the selected data entry field. The indication may be received by the remote UI device 100 at 129 to enable the remote UI device 100 to display the current data content of the data entry field in a data entry input interface (e.g., a virtual keyboard with an associated date entry field). In this regard, for example, the indication may be the transmission of a message to the remote UI device 100 that includes the retrieved data entry value. The message may be a cut text message such as a VNC Server Cut Text message. If the data entry field is empty, the message may be left empty, filled with a pre-defined value, or not sent at all. In example embodiments where the message is not sent in the event of an empty data entry field, the remote UI device 100 may be configured to implement a timeout counter to determine or receive the indication of the current content of the data entry field. Further, if the message is sent, the message may include a dedicated identifier (e.g., textual identifier) to link the message to a virtual keyboard trigger message. The virtual keyboard trigger message may include a complimentary dedicated identifier that may be the same identifier or a derivative of the identifier and may be used for matching and verification.

At 130, the remote UI device 100 may be configured to present a data entry input interface and populate an associated data entry field with the current data content of the selected data entry field. The data entry field associated with the data entry input interface (e.g., the virtual keyboard) of the remote UI device 100 may be isolated from the native presentation of the selected data entry field as described above.

Note that according to various example embodiments, the remote virtual keyboard trigger transmission at 125 may be alternatively performed after the indication of the retrieved data content is provided at 128. As such, according to some example embodiments, the order of the VNC Server Cut Text message and the VNC TM Virtual Keyboard Trigger message may be switched, although specifying one specific order as a standard may be advantageous.

Further, according to some example embodiments, either the UE 101 or the remote UI device 100 may analyze the current data content of the selected data entry field and determine a number of data entry completion possibilities (e.g., recommendations) using a data entry completion algorithm, to facilitate ease of use by a user that may be driving. Similarly, if the virtual keyboard implemented by the remote UI device 100 includes a predictive text capability or speller capability, the remote UI device 100 may utilize the retrieved, current data content of the data entry field as an input to a text prediction algorithm/speller to determine the next set of allowed input characters or completions.

Additionally or alternatively, according to some example embodiments, the current data content of the selected data entry field may be analyzed, either at the remote UI device 100 or at the UE 101, to identify a data type (e.g., alphabetic only data, numeric only data, or the like), and based on the data type, a variation of the data entry input interface (e.g., a variation of the virtual keyboard) may be presented or caused to be presented. Accordingly, for example, the remote UI device 100 may analyze the current data content of the selected data entry field and determine the specific type of virtual key entry user interface (e.g., the type of keyboard) to be displayed. For example, if current data content is all numbers, the remote UI device 100 may present a numeric keypad, whereas if the current data content of the selected data entry field includes alphabetic characters, then an alphanumeric or an alphabetic only keyboard may be presented. Additionally or alternatively, in some example embodiments, the UE 101 may not only notify the remote UI device 100 of the need for a virtual keyboard, but also the type of keyboard to be presented by analyzing the current content of the selected data entry field at the UE 101. The remote UI device 100 may present an appropriate keyboard as described above.

Additionally or alternatively, context information about the remote UI device 100 and/or its environment can be analyzed, and a variation of the data entry input interface (e.g., a variation of the virtual keyboard) may be presented or caused to be presented based on the analysis of the context information. For example, the context of the vehicle in which the remote UI device is installed (e.g., the current speed, the current visibility, etc.) may be analyzed either by the remote UI device 100 or by the UE 101 to determine the type of virtual keyboard to present.

Figure 6:
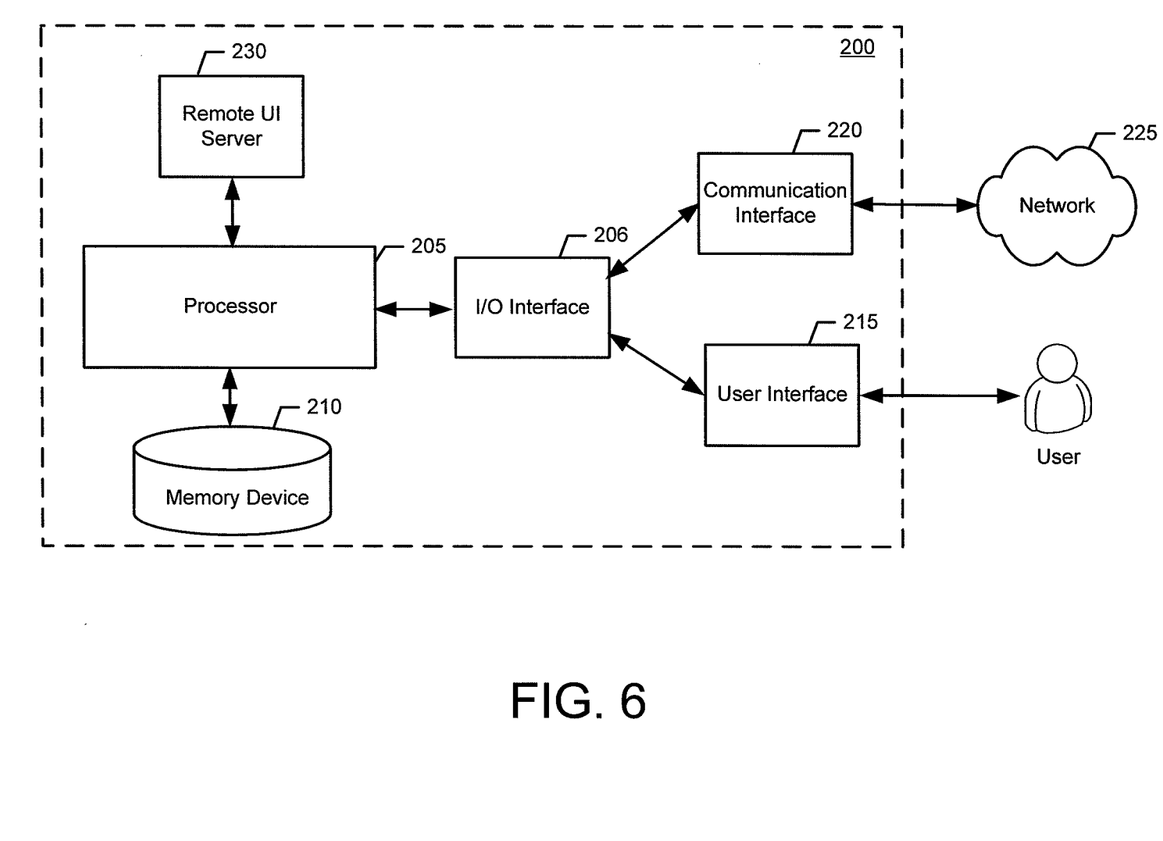
FIG. 6 illustrates a block diagram of an apparatus of a user equipment configured according to various example embodiments.
Figure 7:
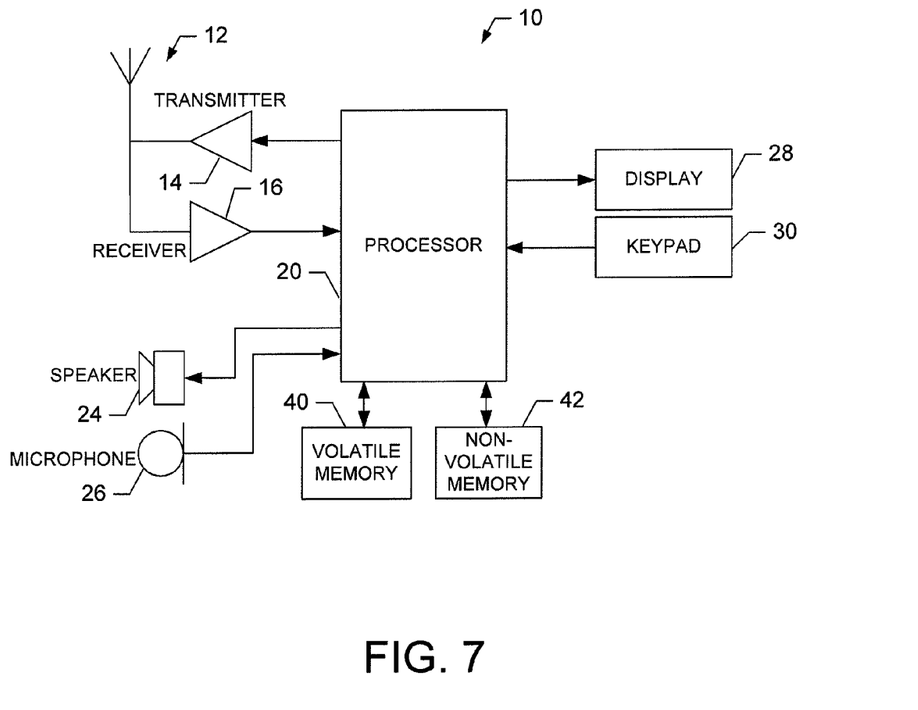
FIG. 7 illustrates a block diagram of a mobile terminal configured according to various example embodiments.
Figure 8:
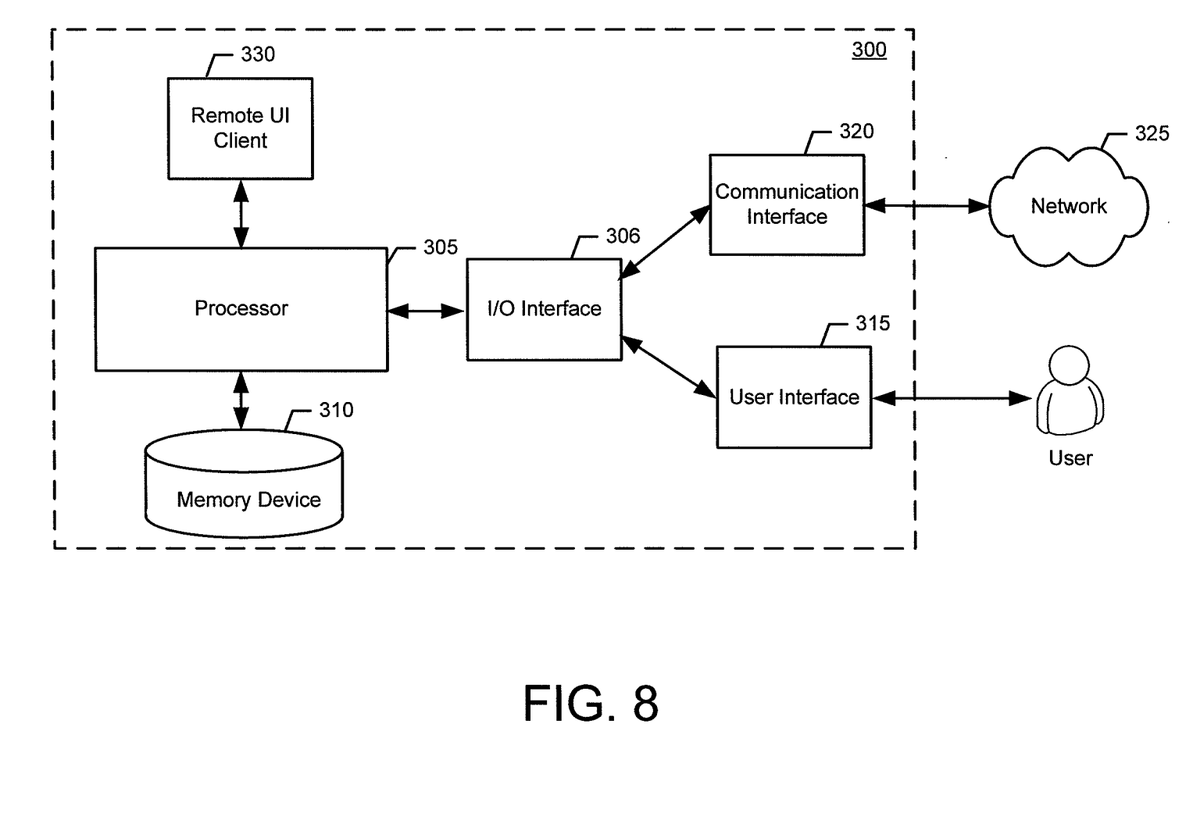
FIG. 8 illustrates a block diagram of an apparatus of a remote user interface device configured according to various example embodiments.

The description provided above and generally herein illustrates example methods, example apparatuses, and example computer programs stored on a non-transitory computer readable medium for providing data entry content to a remote environment. FIGS. 6, 7, an 8 illustrate example apparatus embodiments of the present invention configured to perform the various functionalities described herein. FIG. 6 depicts an example apparatus that is configured to perform various functionalities from the perspective of a UE (e.g., UE 101) as described with respect to FIGS. 1-5 and as generally described herein. FIG. 7 depicts an example UE apparatus in the form of a more specific mobile terminal configured to perform various functionalities from the perspective of a UE 101 depicted in FIGS. 1-5 and as generally described herein. FIG. 8 depicts an example apparatus that is configured to perform various functionalities from the perspective of a remote environment (e.g., remote UI device 100) as described with respect to FIGS. 1-5 and as generally described herein. The example apparatuses depicted in FIGS. 6, 7, and 8 may also be configured to perform example methods of the present invention, such as those described with respect to FIG. 5.

Referring now to FIG. 6, in some example embodiments, the apparatus 200 may, be embodied as, or included as a component of, a communications device with wired and/or wireless communications capabilities. In this regard, the apparatus 200 may be configured to operate in accordance with the functionality of a UE as described herein. In some example embodiments, the apparatus 200 may be part of a communications device (e.g., UE 101), such as a stationary or a mobile terminal. As a mobile terminal, the apparatus 200 may be a mobile computer, mobile telephone, a portable digital assistant (PDA), a pager, a mobile television, a gaming device, a mobile computer, a laptop computer, a camera, a video recorder, an audio/video player, a radio, smart phone, tablet or pad device and/or a global positioning system (GPS) device, any combination of the aforementioned, or the like. Regardless of the type of communications device, apparatus 200 may also include computing capabilities.

The example apparatus 200 includes or is otherwise in communication with a processor 205, a memory device 210, an Input/Output (I/O) interface 206, a communications interface 220, user interface 215, and a remote UI server module 230. The processor 205 may be embodied as various means for implementing the various functionalities of example embodiments of the present invention including, for example, a microprocessor, a coprocessor, a controller, a special-purpose integrated circuit such as, for example, an ASIC (application specific integrated circuit), an FPGA (field programmable gate array), or a hardware accelerator, processing circuitry or the like. According to one example embodiment, processor 205 may be representative of a plurality of processors, or one or more multiple core processors, operating in concert. Further, the processor 205 may be comprised of a plurality of transistors, logic gates, a clock (e.g., oscillator), other circuitry, and the like to facilitate performance of the functionality described herein. The processor 205 may, but need not, include one or more accompanying digital signal processors. In some example embodiments, the processor 205 is configured to execute instructions stored in the memory device 210 or instructions otherwise accessible to the processor 205. The processor 205 may be configured to operate such that the processor causes the apparatus 200 to perform various functionalities described herein.

Whether configured as hardware or via instructions stored on a computer-readable storage medium, or by a combination thereof, the processor 205 may be an entity capable of performing operations according to embodiments of the present invention while configured accordingly. Thus, in example embodiments where the processor 205 is embodied as, or is part of, an ASIC, FPGA, or the like, the processor 205 is specifically configured hardware for conducting the operations described herein. Alternatively, in example embodiments where the processor 205 is embodied as an executor of instructions or computer program code stored on a non-transitory computer-readable storage medium, the instructions specifically configure the processor 205 to perform the algorithms and operations described herein (e.g., those described with respect to FIG. 5). In some example embodiments, the processor 205 is a processor of a specific device (e.g., a mobile terminal) configured for employing example embodiments of the present invention by further configuration of the processor 205 via executed instructions for performing the algorithms, methods, and operations described herein.

The memory device 210 may be one or more non-transitory computer-readable storage media that may include volatile and/or non-volatile memory. In some example embodiments, the memory device 210 includes Random Access Memory (RAM) including dynamic and/or static RAM, on-chip or off-chip cache memory, and/or the like. Further, memory device 210 may include non-volatile memory, which may be embedded and/or removable, and may include, for example, read-only memory, flash memory, magnetic storage devices (e.g., hard disks, floppy disk drives, magnetic tape, etc.), optical disc drives and/or media, non-volatile random access memory (NVRAM), and/or the like. Memory device 210 may include a cache area for temporary storage of data. In this regard, some or all of memory device 210 may be included within the processor 205.

Further, the memory device 210, which may be one or more memory devices, may be configured to store information, data, applications, computer-readable program code instructions, and/or the like for enabling the processor 205 and the example apparatus 200 to carry out various functions in accordance with example embodiments of the present invention described herein. For example, the memory device 210 could be configured to buffer input data for processing by the processor 205. Additionally, or alternatively, the memory device 210 may be configured to store instructions for execution by the processor 205.

The I/O interface 206 may be any device, circuitry, or means embodied in hardware, software, or a combination of hardware and software that is configured to interface the processor 205 with other circuitry or devices, such as the communications interface 220 and the user interface 215. In some example embodiments, the processor 205 may interface with the memory 210 via the I/O interface 206. The I/O interface 206 may be configured to convert signals and data into a form that may be interpreted by the processor 205. The I/O interface 206 may also perform buffering of inputs and outputs to support the operation of the processor 205. According to some example embodiments, the processor 205 and the I/O interface 206 may be combined onto a single chip or integrated circuit configured to perform, or cause the apparatus 200 to perform, various functionalities of the present invention.

The communication interface 220 may be any device or means (e.g., circuitry) embodied in hardware, a computer program product, or a combination of hardware and a computer program product that is configured to receive and/or transmit data from/to a network 225 and/or any other device or module in communication with the example apparatus 200 (e.g., remote UI device 100). The communications interface may be configured to communicate information via any type of wired or wireless connection, and via any type of communications protocol, such as a communications protocol that supports cellular communications or near field communications. According to various example embodiments, the communication interface 220 may be configured to support the transmission and reception of communications in a variety of networks including, but not limited to Internet Protocol-based networks (e.g., the Internet), cellular networks, or the like. Further, the communications interface 220 may be configured to support device-to-device communications, such as in a mobile ad hoc network (MANET). Processor 205 may also be configured to facilitate communications via the communications interface 220 by, for example, controlling hardware comprised within the communications interface 220. In this regard, the communication interface 220 may comprise, for example, communications driver circuitry (e.g., circuitry that supports wired communications via, for example, fiber optic connections), one or more antennas, a transmitter, a receiver, a transceiver and/or supporting hardware, including, for example, a processor for enabling communications. Via the communication interface 220, the example apparatus 200 may communicate with various other network entities in a device-to-device fashion and/or via indirect communications via a base station, access point, server, gateway, router, or the like.

The user interface 215 may be in communication with the processor 205 to receive user input via the user interface 215 and/or to present output to a user as, for example, audible, visual, mechanical or other output indications. The user interface 215 may include, for example, a keyboard, a mouse, a joystick, a display (e.g., a touch screen display), a microphone, a speaker, or other input/output mechanisms. Further, the processor 205 may comprise, or be in communication with, user interface circuitry configured to control at least some functions of one or more elements of the user interface. The processor 205 and/or user interface circuitry may be configured to control one or more functions of one or more elements of the user interface through computer program instructions (e.g., software and/or firmware) stored on a memory accessible to the processor 205 (e.g., volatile memory, non-volatile memory, and/or the like). In some example embodiments, the user interface circuitry is configured to facilitate user control of at least some functions of the apparatus 200 through the use of a display and configured to respond to user inputs. The processor 205 may also comprise, or be in communication with, display circuitry configured to display at least a portion of a user interface, the display and the display circuitry configured to facilitate user control of at least some functions of the apparatus 200.

The remote UI server module 230 of example apparatus 200 may be any means or device embodied, partially or wholly, in hardware, a non-transitory computer readable medium having a computer program stored thereon, or a combination of hardware and a non-transitory computer readable medium having a computer program stored thereon, such as processor 205 implementing stored instructions to configure the example apparatus 200, or a hardware configured processor 205, that is configured to carry out the functions of the remote UI server module 230 as described herein. In an example embodiment, the processor 205 includes, or controls, the remote UI server module 230. The remote UI server module 230 may be, partially or wholly, embodied as processors similar to, but separate from processor 205. In this regard, the remote UI server module 230 may be in communication with the processor 205. In various example embodiments, the remote UI server module 230 may, partially or wholly, reside on differing apparatuses such that some or all of the functionality of the remote UI server module 230 may be performed by a first apparatus, and the remainder of the functionality of the remote UI server module 230 may be performed by one or more other apparatuses.

The apparatus 200 and the processor 205 may be configured to perform the following functionality via the remote UI server module 230. In this regard, the remote UI server module 230 may be configured to receive a data entry field selection message notifying that a selection of a data entry field has occurred at a remote device and modify a focus of a user interface to the data entry field. The remote UI server module 230 may be further configured to retrieve current data content of the data entry field, and cause an indication to be provided to the remote device informing the remote device of the current data content of the data entry field. Providing the indication may enable the remote device to display the current data content of the data entry field in a data entry input interface.

Additionally, in some example embodiments, the remote UI server module 230 may be configured to trigger the remote device to display the data entry input interface to enable data entry associated with the data entry field. Additionally or alternatively, according to some example embodiments, the remote UI server module 230 may be configured to cause an indication to be provided to the remote device informing the remote device of the current data content of the data entry field to enable the remote device to display the current data content of the data entry field in a second data entry field that is presented as being isolated from a native presentation of the data entry field. According to some example embodiments, the remote UI server module 230 may be additionally or alternatively configured to analyze the current data content of the data entry field and determine a number of data entry completion possibilities using a data entry completion prediction algorithm. Additionally or alternatively, according to some example embodiments, the remote UI server module 230 may be configured to analyze the current data content of the data entry field to identify a data type, and cause a variation of the data entry input interface to be presented at the remote device based on the data type. According to some example embodiments, the remote UI server module 230 may be additionally or alternatively configured to analyze context information associated with the remote device, and causing a variation of the data entry input interface to be presented at the remote device based on the context information.

Referring now to FIG. 7, a more specific example apparatus in accordance with various embodiments of the present invention is provided. The example apparatus of FIG. 7 is a mobile terminal 10 configured to communicate within a wireless network, such as a cellular communications network. The mobile terminal 10 may be configured to perform the functionality of UE 101 and/or apparatus 200 as described herein. In some example embodiments, the mobile terminal 10 may be caused to perform the functionality of the remote UI server module 230 via the processor 20. In this regard, processor 20 may be an integrated circuit or chip configured similar to the processor 205 together with, for example, the I/O interface 206. Further, volatile memory 40 and non-volatile memory 42 may configured to support the operation of the processor 20 as computer readable storage media.

The mobile terminal 10 may further include an antenna 12, a transmitter 14, and a receiver 16, which may be included as parts of a communications interface of the mobile terminal 10. The speaker 24, the microphone 26, the display 28, and the keypad 30 may be included as parts of a user interface.

Referring now to FIG. 8, in some example embodiments, the apparatus 300 may, be embodied as, or included as a component of, a communications device with wired and/or wireless communications capabilities. In this regard, the apparatus 300 may be configured to operate in accordance with the functionality of a remote environment, such as the remote UI device 100 as described herein. In some example embodiments, the apparatus 300 may be part of a communications device (e.g., remote UI device 100), such as a stationary, an installed, or a mobile terminal. As a mobile terminal, the apparatus 300 may be a mobile computer, mobile telephone, a portable digital assistant (PDA), a pager, a mobile television, a gaming device, a mobile computer, a laptop computer, a camera, a video recorder, an audio/video player, a radio, smart phone, tablet or pad device and/or a global positioning system (GPS) device, any combination of the aforementioned, or the like. As an installed device, the apparatus 300 may be a vehicle head unit, a monitor, or the like. Regardless of the type of communications device, apparatus 300 may also include computing capabilities.

The example apparatus 300 includes or is otherwise in communication with a processor 305, a memory device 310, an Input/Output (I/O) interface 306, a communications interface 320, user interface 315, and a remote UI client module 330. The processor 305 may be embodied as various means for implementing the various functionalities of example embodiments of the present invention including, for example, a microprocessor, a coprocessor, a controller, a special-purpose integrated circuit such as, for example, an ASIC (application specific integrated circuit), an FPGA (field programmable gate array), or a hardware accelerator, processing circuitry or the like. According to one example embodiment, processor 305 may be representative of a plurality of processors, or one or more multiple core processors, operating in concert. Further, the processor 305 may be comprised of a plurality of transistors, logic gates, a clock (e.g., oscillator), other circuitry, and the like to facilitate performance of the functionality described herein. The processor 305 may, but need not, include one or more accompanying digital signal processors. In some example embodiments, the processor 305 is configured to execute instructions stored in the memory device 310 or instructions otherwise accessible to the processor 305. The processor 305 may be configured to operate such that the processor causes the apparatus 300 to perform various functionalities described herein.

Whether configured as hardware or via instructions stored on a computer-readable storage medium, or by a combination thereof, the processor 305 may be an entity capable of performing operations according to embodiments of the present invention while configured accordingly. Thus, in example embodiments where the processor 305 is embodied as, or is part of, an ASIC, FPGA, or the like, the processor 305 is specifically configured hardware for conducting the operations described herein. Alternatively, in example embodiments where the processor 305 is embodied as an executor of instructions or computer program code stored on a non-transitory computer-readable storage medium, the instructions specifically configure the processor 305 to perform the algorithms and operations described herein (e.g., those described with respect to FIG. 5). In some example embodiments, the processor 305 is a processor of a specific device (e.g., a mobile terminal) configured for employing example embodiments of the present invention by further configuration of the processor 305 via executed instructions for performing the algorithms, methods, and operations described herein.

The memory device 310 may be one or more non-transitory computer-readable storage media that may include volatile and/or non-volatile memory. In some example embodiments, the memory device 310 includes Random Access Memory (RAM) including dynamic and/or static RAM, on-chip or off-chip cache memory, and/or the like. Further, memory device 310 may include non-volatile memory, which may be embedded and/or removable, and may include, for example, read-only memory, flash memory, magnetic storage devices (e.g., hard disks, floppy disk drives, magnetic tape, etc.), optical disc drives and/or media, non-volatile random access memory (NVRAM), and/or the like. Memory device 310 may include a cache area for temporary storage of data. In this regard, some or all of memory device 310 may be included within the processor 305.

Further, the memory device 310, which may be one or more memory devices, may be configured to store information, data, applications, computer-readable program code instructions, and/or the like for enabling the processor 305 and the example apparatus 300 to carry out various functions in accordance with example embodiments of the present invention described herein. For example, the memory device 310 could be configured to buffer input data for processing by the processor 305. Additionally, or alternatively, the memory device 310 may be configured to store instructions for execution by the processor 305.

The I/O interface 306 may be any device, circuitry, or means embodied in hardware, software, or a combination of hardware and software that is configured to interface the processor 305 with other circuitry or devices, such as the communications interface 320 and the user interface 315. In some example embodiments, the processor 305 may interface with the memory 310 via the I/O interface 306. The I/O interface 306 may be configured to convert signals and data into a form that may be interpreted by the processor 305. The I/O interface 306 may also perform buffering of inputs and outputs to support the operation of the processor 305. According to some example embodiments, the processor 305 and the I/O interface 306 may be combined onto a single chip or integrated circuit configured to perform, or cause the apparatus 300 to perform, various functionalities of the present invention.

The communication interface 320 may be any device or means (e.g., circuitry) embodied in hardware, a computer program product, or a combination of hardware and a computer program product that is configured to receive and/or transmit data from/to a network 335 and/or any other device or module in communication with the example apparatus 300 (e.g., UE 101). The communications interface may be configured to communicate information via any type of wired or wireless connection, and via any type of communications protocol, such as a communications protocol that supports cellular communications or near field communications. According to various example embodiments, the communication interface 320 may be configured to support the transmission and reception of communications in a variety of networks including, but not limited to Internet Protocol-based networks (e.g., the Internet), cellular networks, or the like. Further, the communications interface 320 may be configured to support device-to-device communications, such as in a mobile ad hoc network (MANET). Processor 305 may also be configured to facilitate communications via the communications interface 320 by, for example, controlling hardware comprised within the communications interface 320. In this regard, the communication interface 320 may comprise, for example, communications driver circuitry (e.g., circuitry that supports wired communications via, for example, fiber optic connections), one or more antennas, a transmitter, a receiver, a transceiver and/or supporting hardware, including, for example, a processor for enabling communications. Via the communication interface 320, the example apparatus 300 may communicate with various other network entities in a device-to-device fashion and/or via indirect communications via a base station, access point, server, gateway, router, or the like.

The user interface 315 may be in communication with the processor 305 to receive user input via the user interface 315 and/or to present output to a user as, for example, audible, visual, mechanical or other output indications. The user interface 315 may include, for example, a keyboard, a mouse, a joystick, a display (e.g., a touch screen display), a microphone, a speaker, or other input/output mechanisms. Further, the processor 305 may comprise, or be in communication with, user interface circuitry configured to control at least some functions of one or more elements of the user interface. The processor 305 and/or user interface circuitry may be configured to control one or more functions of one or more elements of the user interface through computer program instructions (e.g., software and/or firmware) stored on a memory accessible to the processor 305 (e.g., volatile memory, non-volatile memory, and/or the like). In some example embodiments, the user interface circuitry is configured to facilitate user control of at least some functions of the apparatus 300 through the use of a display and configured to respond to user inputs. The processor 305 may also comprise, or be in communication with, display circuitry configured to display at least a portion of a user interface, the display and the display circuitry configured to facilitate user control of at least some functions of the apparatus 300.

The remote UI client module 330 of example apparatus 300 may be any means or device embodied, partially or wholly, in hardware, a non-transitory computer readable medium having a computer program stored thereon, or a combination of hardware and a non-transitory computer readable medium having a computer program stored thereon, such as processor 305 implementing stored instructions to configure the example apparatus 300, or a hardware configured processor 305, that is configured to carry out the functions of the remote UI client module 330 as described herein. In an example embodiment, the processor 305 includes, or controls, the remote UI client module 330. The remote UI client module 330 may be, partially or wholly, embodied as processors similar to, but separate from processor 305. In this regard, the remote UI client module 330 may be in communication with the processor 305. In various example embodiments, the remote UI client module 330 may, partially or wholly, reside on differing apparatuses such that some or all of the functionality of the remote UI client module 330 may be performed by a first apparatus, and the remainder of the functionality of the remote UI client module 330 may be performed by one or more other apparatuses.

The apparatus 300 and the processor 305 may be configured to perform the following functionality via the remote UI client module 330. In this regard, the remote UI client module 330 may be configured to receive a selection of a data entry field at a first device and cause a data entry field selection message to be transmitted, by the first device to a second device, notifying the second device that the selection of the data entry field has occurred. The remote UI client module 330 may be further configured to receive an indication from the first device informing the second device of the current data content of the data entry field, and populate the data entry field in a data entry input interface with the current data content.

Additionally, according to some example embodiments, the remote UI client module 330 may be further configured to receive a signal triggering the second device to present the data entry input interface to enable data to be entered in association with the data entry field. Additionally or alternatively, according to some example embodiments, the remote UI client module 330 may be configured to cause presentation of the current data content of the data entry field in a second data entry field that is presented as being isolated from a native presentation of the data entry field. According to some example embodiments, the remote UI client module 330 may be additionally or alternatively configured to analyze the current data content of the data entry field, and determine a number of data entry completion possibilities using a data entry completion prediction algorithm. Additionally or alternatively, the remote UI client module 330 may be further configured to analyze the current data content of the data entry field to identify a data type, and cause a variation of the data entry input interface to be presented at the second device based on the data type. According to some example embodiments, the remote UI client module 330 may be additionally or alternatively configured to analyze context information associated with the second device, and cause a variation of the data entry input interface to be presented at the second device based on the context information.

As described above, FIG. 5 illustrates flowcharts of example systems, methods, and/or computer programs stored on a non-transitory computer readable medium (e.g., computer program product) according to example embodiments of the invention. It will be understood that each block or operation of the flowcharts, and/or combinations of blocks or operations in the flowcharts, can be implemented by various means. Means for implementing the blocks or operations of the flowcharts, combinations of the blocks or operations in the flowchart, or other functionality of example embodiments of the present invention described herein may include hardware, and/or a non-transitory computer-readable storage medium having one or more computer program code instructions, program instructions, or executable computer-readable program code instructions stored therein. In this regard, program code instructions may be stored on a memory device, such as memory device 210 or 310, of an example apparatus, such as example apparatus 200 or 300, and executed by a processor, such as processor 205 or 305. As will be appreciated, any such program code instructions may be loaded onto a computer or other programmable apparatus (e.g., processor 205 or 305, memory device 210 or 310, or the like) from a computer-readable storage medium to produce a particular machine, such that the particular machine becomes a means for implementing the functions specified in the flowcharts' block(s) or operation(s). These program code instructions may also be stored in a computer-readable storage medium that can direct a computer, a processor, or other programmable apparatus to function in a particular manner to thereby generate a particular machine or particular article of manufacture. The instructions stored in the computer-readable storage medium may produce an article of manufacture, where the article of manufacture becomes a means for implementing the functions specified in the flowcharts' block(s) or operation(s). The program code instructions may be retrieved from a computer-readable storage medium and loaded into a computer, processor, or other programmable apparatus to configure the computer, processor, or other programmable apparatus to execute operations to be performed on or by the computer, processor, or other programmable apparatus.

Retrieval, loading, and execution of the program code instructions may be performed sequentially such that one instruction is retrieved, loaded, and executed at a time. In some example embodiments, retrieval, loading and/or execution may be performed in parallel such that multiple instructions are retrieved, loaded, and/or executed together. Execution of the program code instructions may produce a computer-implemented process such that the instructions executed by the computer, processor, or other programmable apparatus provide operations for implementing the functions specified in the flowcharts' block(s) or operation(s).

Accordingly, execution of instructions associated with the blocks or operations of the flowchart by a processor, or storage of instructions associated with the blocks or operations of the flowcharts in a computer-readable storage medium, support combinations of operations for performing the specified functions. It will also be understood that one or more blocks or operations of the flowcharts, and combinations of blocks or operations in the flowcharts, may be implemented by special purpose hardware-based computer systems and/or processors which perform the specified functions, or combinations of special purpose hardware and program code instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

What is claimed is:

1. A method comprising:
   receiving, at a first device, a data entry field selection message notifying that a selection of a data entry field has occurred at a remote device;
   modifying a focus of a user interface of the first device to the data entry field;
   retrieving current data content of the data entry field; and
   causing an indication to be provided to the remote device informing the remote device of the current data content of the data entry field to enable the remote device to display the current data content of the data entry field in a data entry input interface.

2. The method of claim 1 further comprising triggering the remote device to display the data entry input interface to enable data entry associated with the data entry field.

3. The method of claim 1 wherein causing the indication to be provided to the remote device includes causing an indication to be provided to the remote device informing the remote device of the current data content of the data entry field to enable the remote device to display the current data content of the data entry field in a second data entry field that is presented as being isolated from a native presentation of the data entry field.

4. The method of claim 1 further comprising:
   analyzing the current data content of the data entry field; and
   determining a number of data entry completion possibilities using a data entry completion prediction algorithm.

5. The method of claim 1 further comprising:
   analyzing the current data content of the data entry field to identify a data type; and
   causing a variation of the data entry input interface to be presented at the remote device based on the data type.

6. The method of claim 1 further comprising:
   analyzing context information associated with the remote device; and
   causing a variation of the data entry input interface to be presented at the remote device based on the context information.

7. An apparatus comprising at least one processor and at least one memory including computer program code, the at least one memory and the computer program code configured to, with the at least one processor, direct the apparatus at least to:
   receive a data entry field selection message notifying that a selection of a data entry field has occurred at a remote device;
   modify a focus of a user interface to the data entry field;
   retrieve current data content of the data entry field; and
   cause an indication to be provided to the remote device informing the remote device of the current data content of the data entry field to enable the remote device to display the current data content of the data entry field in a data entry input interface.

8. The apparatus of claim 7, wherein the apparatus is further directed to trigger the remote device to display the data entry input interface to enable data entry associated with the data entry field.

9. The apparatus of claim 7, wherein the apparatus directed to cause the indication to be provided to the remote device includes being directed to cause an indication to be provided to the remote device informing the remote device of the current data content of the data entry field to enable the remote device to display the current data content of the data entry field in a second data entry field that is presented as being isolated from a native presentation of the data entry field.

10. The apparatus of claim 7, wherein the apparatus is further directed to:
    analyze the current data content of the data entry field; and
    determine a number of data entry completion possibilities using a data entry completion prediction algorithm.

11. The apparatus of claim 7, wherein the apparatus is further directed to:
    analyze the current data content of the data entry field to identify a data type; and
    cause a variation of the data entry input interface to be presented at the remote device based on the data type.

12. The apparatus of claim 7, wherein the apparatus is further directed to:
    analyze context information associated with the remote device; and
    cause a variation of the data entry input interface to be presented at the remote device based on the context information.

13. The apparatus of claim 7, wherein the apparatus comprises a mobile terminal.

14. The apparatus of claim 13, wherein the apparatus further comprises a communications interface including an antenna, the communications interface being configured to establish connecting with the remote device.

15. A method comprising:
receiving a selection of a data entry field at a second device;
causing a data entry field selection message to be transmitted, by the second device to a first device, notifying the first device that the selection of the data entry field has occurred;
receiving an indication from the first device informing the second device of the current data content of the data entry field; and
populating the data entry field in a data entry input interface of the second device with the current data content.

16. The method of claim 15 further comprising receiving a signal triggering the second device to present the data entry input interface to enable data to be entered in association with the data entry field.

17. The method of claim 15 wherein causing presentation of the current data content includes causing presentation of the current data content of the data entry field in a second data entry field that is presented as being isolated from a native presentation of the data entry field.

18. The method of claim 15 further comprising:
analyzing the current data content of the data entry field; and
determining a number of data entry completion possibilities using a data entry completion prediction algorithm.

19. The method of claim 15 further comprising:
analyzing the current data content of the data entry field to identify a data type; and
causing a variation of the data entry input interface to be presented at the second device based on the data type.

20. The method of claim 15 further comprising:
analyzing context information associated with the second device; and
causing a variation of the data entry input interface to be presented at the second device based on the context information.

21. An apparatus comprising at least one processor and at least one memory including computer program code, the at least one memory and the computer program code configured to, with the at least one processor, direct the apparatus at least to:
receive a selection of a data entry field at a second device;
cause a data entry field selection message to be transmitted, by the second device to a first device, notifying the first device that the selection of the data entry field has occurred;
receive an indication from the first device informing the second device of the current data content of the data entry field; and
populate the data entry field in a data entry input interface of the second device with the current data content.

22. The apparatus of claim 21, wherein the apparatus is further configured to receive a signal triggering the second device to present the data entry input interface to enable data to be entered in association with the data entry field.

23. The apparatus of claim 21, wherein the apparatus directed to cause presentation of the current data content includes being directed to cause presentation of the current data content of the data entry field in a second data entry field that is presented as being isolated from a native presentation of the data entry field.

24. The apparatus of claim 21, wherein the apparatus is further directed to:
analyze the current data content of the data entry field; and
determine a number of data entry completion possibilities using a data entry completion prediction algorithm.

25. The apparatus of claim 21, wherein the apparatus is further directed to:
analyze the current data content of the data entry field to identify a data type; and
cause a variation of the data entry input interface to be presented at the second device based on the data type.

26. The apparatus of claim 21, wherein the apparatus is further directed to:
analyze context information associated with the second device; and
cause a variation of the data entry input interface to be presented at the second device based on the context information.

* * * * *